United States Patent [19]
Nishigori et al.

[11] 3,936,613
[45] Feb. 3, 1976

[54] CAMP-ON DETECTING SYSTEM FOR AUTOMATIC TELEPHONE EXCHANGE

[75] Inventors: Shogo Nishigori, Kanagawa; Masahiko Kusama, Fujisawa, both of Japan

[73] Assignee: Hitachi, Ltd., Japan

[22] Filed: May 17, 1974

[21] Appl. No.: 471,048

[30] Foreign Application Priority Data
May 21, 1973 Japan.............................. 48-55631

[52] U.S. Cl. ........................................... 179/18 BG
[51] Int. Cl.² ......................................... H04M 3/42
[58] Field of Search ............................... 179/18 BG

[56] References Cited
UNITED STATES PATENTS

| | | | |
|---|---|---|---|
| 3,355,555 | 11/1967 | Thelemaque | 179/18 BG |
| 3,676,606 | 7/1972 | Gueldenpfennig et al. | 179/18 BG |
| 3,796,836 | 2/1974 | Monleone | 179/18 BG |

*Primary Examiner*—William C. Cooper
*Attorney, Agent, or Firm*—Craig & Antonelli

[57] ABSTRACT

A camp-on detecting system for a private automatic branch exchange (PABX) is provided with the camp-on connecting function for connecting queuing or camp-on calls to a busy line circuit. On detecting that the control line of the line circuit is at a busy potential, the potentials on the control lines of all camping-on trunks are changed and the potential changes are detected by the detecting means connected to the line circuit to detect that a camp-on connection has already been made to the line circuit.

6 Claims, 3 Drawing Figures

CAMP-ON DETECTING SYSTEM FOR AUTOMATIC TELEPHONE EXCHANGE

The present invention relates to an automatic telephone exchange, and more particularly, to a campon system which, in extending a call from a central office line or a private line to an extension in, for example, a private automatic branch exchange (PABX), closes the connection path to the extension and waits if the extension is busy, and calls automatically the extension when the extension becomes disengaged or idle.

In a prior art camp-on system, when two or more calls are simultaneously waiting for the same busy extension, there is the possibility that the calls will be simultaneously connected to the extension, to result in a double or multiple connection when the extension becomes idle. Further, there is the disadvantage that, if there are a number of campon calls for the same extension, a number of primary links from the primary lattice accommodating the extension will be occupied, so that the link block rate to the other extensions accommodated in the same lattice is greatly increased.

An object of the present invention is to provide a camp-on detecting system which prevents a busy extension from being connected with two or more camp-on calls simultaneously by detecting whether or not the extension has already acquired a camp-on connection.

Another object of the present invention is to provide a camp-on detecting system which prevents a multiple camp-on connection and an increase in the link blocking rate due to the multiple campon connection.

The feature of the present invention is that the camp-on detecting system comprises a busy detecting means for detecting whether the control line of a subscriber's circuit is at a busy potential, camp-on potential detecting means adapted to be connected by the operation of the busy detecting means to the control line of the subscriber's circuit, and potential changing means for changing the busy potential supplied to the control line of the camping on trunk by the operation of the busy detecting means into a camp-on detecting potential, whereby, upon detecting that the control line of the subscriber's extension circuit is at a busy potential, the potentials on the control lines of all the camping-on trunks are changed and the potential changes are detected by the detecting means connected to the subscriber's circuit to detect that the camp-on connection has already been made to the subscriber's extension circuit.

The above and other objects, features and advantages of the present invention will become more apparent from the following detailed description of the preferred embodiment of the present invention when taken in conjunction with the accompanying drawings, in which.

Figure 1:
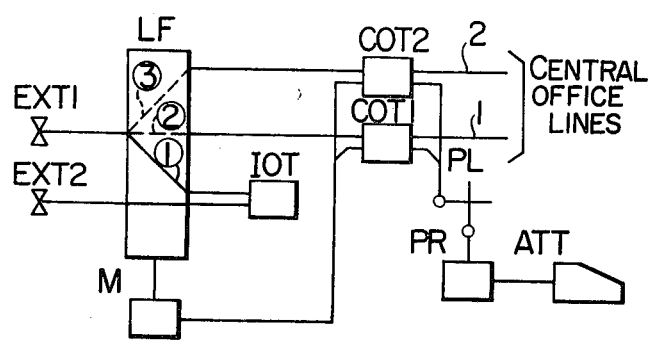
FIG. 1 is a schematic diagram of a transit or trunking system relating to the camp-on connection in a private automatic branch exchange.

In FIG. 1 reference characters COT1 and COT2 designate central office trunks, reference character PR designates a position register, reference character ATT designates an attendant's turret, reference character PL designates a position link for connecting the central office trunks COT1 and COT2 with the position register PR, reference character IOT designates an intra-office trunk, reference character LF designates a line frame for forming channels between various trunks and extensions, reference characters EXT1 and EXT2 designate extensions, and reference character M designates a marker.

When, for example, the extension EXT1 is to be connected with a call from the central office line 1 while the extension EXT1 is talking or in a busy state with the extension EXT2 through the intra-office trunk IOT and the channel ① in the line frame LF, the operator would access the marker M to link the central office trunk COT1 with the extension EXT1. At this time, if the marker M detects that the extension EXT1 is in a busy state, the marker M begins the detection operation of whether or not any camp-on call is present. Since, in the illustrated state, no camp-on call is present, the marker M is released by forming the channel ②, whereby the central office trunk COT1 is brought into a camp-on state. When the connection to the extension EXT 1 is again required by the office line 2, the marker M is driven similarly as in the above case to detect that the extension EXT1 is in the busy state. Next, to determine whether or not any camp-on call for the extension EXT1 is present, the marker M supplies a positive potential to the control line for the channel in the camping-on central office trunk. The marker M detects the positive potential from the control line for the line circuit of the extension EXT1 to recognize that a camp-on call has already been present. This positive potential is such a potential that does not activate the device connected with the control line, such as a call meter, and yet is a potential detectable by the marker. The marker is released without connecting the central office trunk COT2 with the extension EXT1. In this manner, the simultaneous connection of two or more camp-on calls to an extension, i.e. a double camp-on connection, is prevented.

Figure 2:
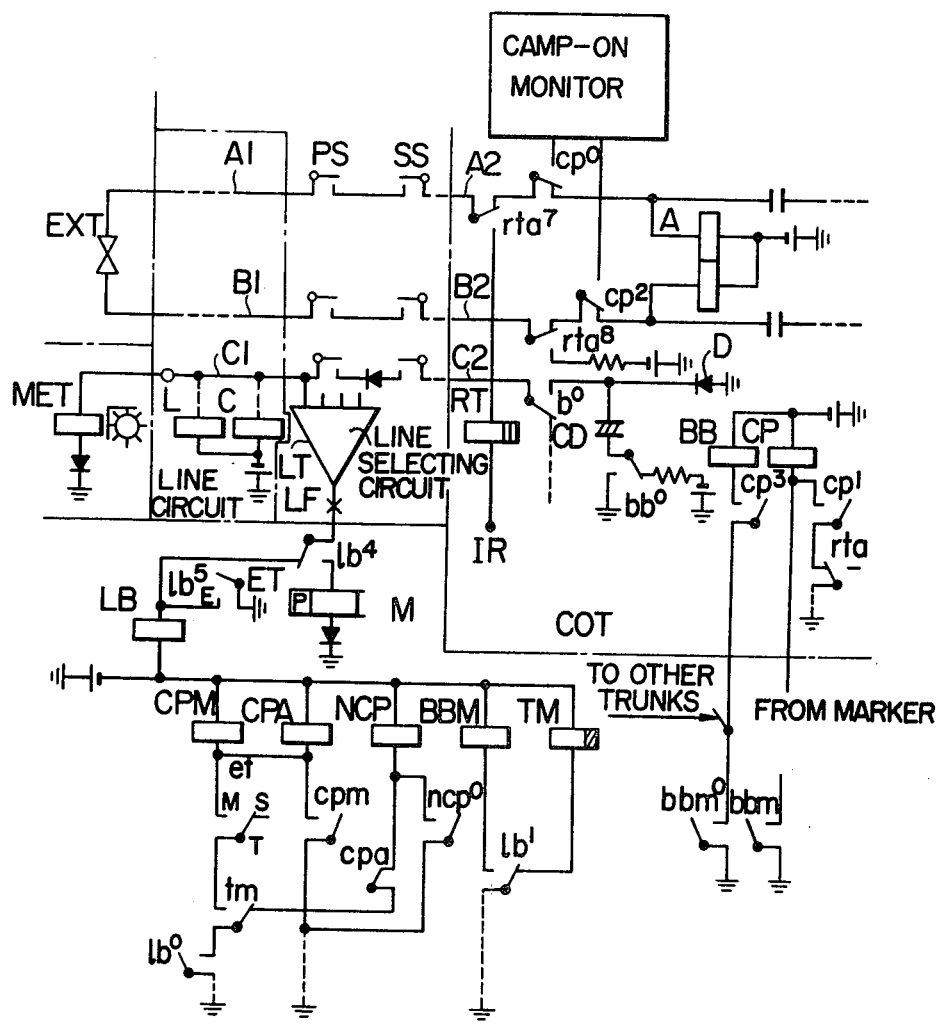
FIG. 2 is a schematic circuit diagram of an embodiment of the present invention.

FIG. 2 a schematic circuit diagram of an embodiment of the central office trunk COT, the line frame LF, and the marker M. According to the present invention, the marker M is actuated by an incoming trunk connection to perform the busy test of the called extension through a line selecting circuit LT. When the called extension is busy or engaged, ground potential on the control line C1 of a line circuit (consisting of relays L and C) is supplied to the marker M through the selecting circuit LT in the line frame LF to activate a self-holding relay LB. The marker M then begins to determine whether or not any camp-on call for the busy or engaged extension is present. The operating ground potential of a relay TM, which was operating when the marker was activated, is first cut off to release the relay TM after a certain time period due to its slow releasing property. Upon the activation of the relay LB relay BBM is activated. The relay BBM instructs a control line C2 to supply a positive potential to all trunks which are camping on. That is, when the relay BBM in the marker M is activated, the relay BB in the camping-on central office trunk COT is activated through the contact $cp^3$ in the making of a relay CP to supply, through its contact $bb^0$, the control line C2, extending from the central office trunk COT to the line frame LF, with a positive potential discharged from a capacitor CD in place of the ground potential, which is the busy potential having been supplied previously through a diode D. This positive potential enters the marker M through the switch contact of the line frame LF and the same circuit as for the busy test. Since, in the marker M, a highly sensitive polarized relay ET for positive potential detection has been connected to the selecting circuit LT by the action of the relay LB, the relay ET is momentarily activated by the discharged current from the capacitor CD in the central office trunk COT. By the actuation of the relay ET, a quick operation type reed relay CPM is actuated to activate an auxiliary relay CPA via the contact CPM of the self-holding relay CPM so that the marker M detect a camp-on call having been present. When no camp-on call is present, after the release of the relay TM, a relay NCP is activated because of the relay CPA not being activated, so that absence of any campon call is detected. In this embodiment, the capacitance of the capacitor CD in the central office trunk COT is determined such that the relays ET and CPM in the marker M can be activated and a call meter MET is not activated by the discharge of the capacitor CD. This is to prevent the malfunctioning of the call meter due to the discharge of the capacitor CD in the central office trunk COT, unlike in the ordinary method in which the call meter for the extension is activated by the positive pulses on the control line. Though, on the contrary, the marker M may erroneously detect the positive potential pulse for activating the call meter MET as the camp-on detection signal, the probability thereof is very low, so that it is practically not harmful.

Figure 3:
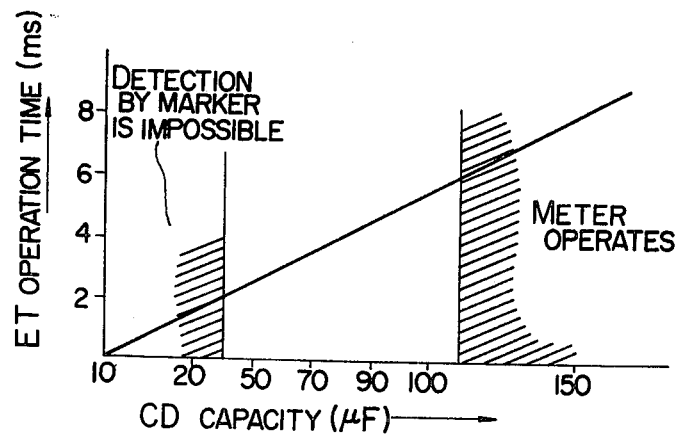
FIG. 3 is a graph for determining the magnitude of a camp-on detecting signal from a central office trunk in the embodiment of FIG. 2.

In FIG. 3 which shows a graph for determining the capacitance of the capacitor CD usable for the camp-on detecting signal, the abscissa represents the capacitance of the capacitor CD and the ordinate represents the time period of the operation of the detection relay ET in the marker. Though the larger the capacitance of the capacitor CD, the longer the operating duration of the detection relay CD, there will be the danger that the call meter is actuated. On the contrary, if the capacitance of the capacitor CD is too small, the operating period of the detection relay ET becomes too short to activate and hold the relay CP in the marker M, so that detection becomes impossible. Consequently, the capacitance of the capacitor CD must be set at an intermediate value therebetween.

Other than the above method by the discharge of the capacitor, the present invention may be performed by such a method as providing a positive potential from a positive potential source in a short period of time during which the call meter cannot be activated.

What we claim is:

1. In a common control type automatic telephone exchange having a marker, trunk circuits and subscriber's line circuits associated therewith, a camp-on detecting system comprising, in combination:
    first means, coupled to a subscriber's line circuit, for detecting the existence of a prescribed busy potential on the control line of said subscriber's line circuit;
    second means, coupled to said first means, and responsive to the existence of a camp-on connection of a trunk circuit with said subscriber's line circuit, for changing the potential on the control line of said trunk circuit to a prescribed camp-on potential only when said first means has detected the presence of said prescribed busy potential on the control line of said subscriber's line circuit.
2. A camp-on detecting system according to claim 1, wherein said subscriber's line circuit includes a line selecting circuit which couples the control line of said subscriber's line circuit to said first and second means.
3. A camp-on detecting system according to claim 1 wherein said second means includes a capacitor circuit for storing a charge corresponding to said prescribed camp-on potential and a switching circuit coupled thereto for discharging said stored charge through the control line of said trunk circuit.
4. A camp-on detecting system according to claim 1, wherein said first means comprises a first relay circuit energized by said busy potential and said second means comprises a second relay circuit energized by the operation of said first relay circuit, and a third relay circuit energized by the operation of said second relay circuit and in response to a camp-on condition of said trunk circuit, the operation of said third relay circuit and said first relay circuit effecting the detection that the busy condition of said subscriber's line circuit is due to a camped-on trunk circuit.
5. A camp-on detecting system according to claim 4, wherein said subscriber's line circuit includes a line selecting circuit which couples the control line of said subscriber's line circuit to said first and third relay circuits.
6. A camp-on detecting system according to claim 5, wherein said second means further includes a capacitor circuit for storing a charge corresponding to said prescribed camp-on potential and a switching circuit coupled thereto for discharging said stored charge through the control line of said trunk circuit, the control line of said subscriber's line circuit, said line selecting circuit, to said third relay circuit, said third relay circuit being energized by the discharge of said capacitor circuit.

* * * * *